(12) United States Patent
Shigeta

(10) Patent No.: US 11,916,434 B2
(45) Date of Patent: Feb. 27, 2024

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Hiroki Shigeta, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 74 days.

(21) Appl. No.: 17/790,585

(22) PCT Filed: Jun. 15, 2020

(86) PCT No.: PCT/JP2020/023413
§ 371 (c)(1),
(2) Date: Jul. 1, 2022

(87) PCT Pub. No.: WO2021/255789
PCT Pub. Date: Dec. 23, 2021

(65) Prior Publication Data
US 2022/0399747 A1 Dec. 15, 2022

(51) Int. Cl.
*H02J 9/06* (2006.01)
*H02M 1/32* (2007.01)
(Continued)

(52) U.S. Cl.
CPC ........ *H02J 9/062* (2013.01); *H02J 7/007194* (2020.01); *H02J 7/345* (2013.01);
(Continued)

(58) Field of Classification Search
CPC .... H02J 7/345; H02J 9/06; H02J 9/061; H02J 9/062; H02J 2207/20; H02J 2207/50; H02M 1/0009; H02M 1/327; H02M 3/42
See application file for complete search history.

(56) References Cited

U.S. PATENT DOCUMENTS

2007/0195568 A1* 8/2007 Sato ................. H02J 7/007182
363/123
2011/0049991 A1 3/2011 Sato et al.
(Continued)

FOREIGN PATENT DOCUMENTS

JP 2009-272233 A 11/2009
JP 2012-166593 A 9/2012
(Continued)

OTHER PUBLICATIONS

International Search Report dated Sep. 15, 2020 in PCT/JP2020/023413, filed on Jun. 15, 2020, 3 pages.
(Continued)

*Primary Examiner* — Levi Gannon
(74) *Attorney, Agent, or Firm* — Oblon, McClelland, Maier & Neustadt, L.L.P.

(57) ABSTRACT

An uninterruptible power supply device includes a bidirectional chopper that converts a first DC voltage supplied from a battery into a second DC voltage and supplies the second DC voltage to an inverter when a power failure of a commercial AC power supply occurs. The bidirectional chopper includes a capacitor that stabilizes the second DC voltage. The uninterruptible power supply device further includes: a current detector that detects an output current of the battery; and a control circuit that, based on a detection result by the current detector, calculates an estimated temperature increase value of the capacitor every time a predetermined time period elapses, and stops an operation of the bidirectional chopper when the calculated estimated temperature increase value is higher than an upper limit value.

5 Claims, 14 Drawing Sheets

(51) Int. Cl.
*H02M 3/42* (2006.01)
*H02J 7/00* (2006.01)
*H02M 1/00* (2006.01)
*H02J 7/34* (2006.01)

(52) U.S. Cl.
CPC ......... *H02M 1/0009* (2021.05); *H02M 1/327* (2021.05); *H02M 3/42* (2013.01); *H02J 2207/50* (2020.01)

(56) References Cited

U.S. PATENT DOCUMENTS

| | | | |
|---|---|---|---|
| 2015/0377808 A1* | 12/2015 | Hironaka | H02M 7/537 374/185 |
| 2019/0149055 A1* | 5/2019 | Tomita | H02M 3/3376 363/17 |
| 2019/0334376 A1 | 10/2019 | Toyoda | |
| 2021/0313877 A1* | 10/2021 | Kim | H02M 3/158 |

FOREIGN PATENT DOCUMENTS

| WO | WO 2010/100737 A1 | 9/2010 |
|---|---|---|
| WO | WO 2018/087876 A1 | 5/2018 |

OTHER PUBLICATIONS

Indian Office Action dated Jun. 13, 2023 in Indian Patent Application No. 202217038411, 5 pages.

* cited by examiner

FIG.7

| VB(V) | PL(kW) | Ib(A) | Ts(K) |
|---|---|---|---|
| 480 | 400 | 833.3 | 39 |
| 440 | 400 | 909.1 | 44 |
| 420 | 400 | 952.4 | 48 |
| 400 | 400 | 1000.0 | 51 | ns
POWER CONVERSION DEVICE

TECHNICAL FIELD

The present invention relates to a power conversion device, and particularly to a power conversion device including a capacitor that stabilizes an output voltage of a chopper.

BACKGROUND ART

For example, International Publication No. 2010/100737 (PTL 1) discloses a power conversion device including a chopper that converts a first DC voltage supplied from a DC power supply into a second DC voltage and supplies the second DC voltage to a DC load, and a capacitor that stabilizes the second DC voltage.

CITATION LIST

Patent Literature

PTL 1: International Publication No. 2010/100737

SUMMARY OF INVENTION

Technical Problem

In such a power conversion device, when an operation of the chopper is started, a temperature of the capacitor increases gradually. When a temperature increase value of the capacitor exceeds an upper limit value, thermal runaway occurs, which causes a breakage of the capacitor. In order to prevent a breakage of a capacitor, a large-capacitance capacitor has been conventionally used to prevent a temperature increase saturation value of the capacitor from exceeding an upper limit value. This has led to an increase in size and cost of the device.

Accordingly, a main object of the present invention is to provide a small-sized and low-cost power conversion device.

Solution to Problem

A power conversion device according to the present invention includes: a chopper that converts a first DC voltage supplied from a DC power supply into a second DC voltage and supplies the second DC voltage to a DC load; a capacitor that stabilizes the second DC voltage; a current detector that detects an output current of the DC power supply; and a control circuit that, based on a detection result by the current detector, estimates a temperature increase value of the capacitor every time a predetermined time period elapses, and stops an operation of the chopper when the estimated temperature increase value is higher than an upper limit value.

Advantageous Effects of Invention

In the power conversion device according to the present invention, based on the detection result by the current detector, the temperature increase value of the capacitor is estimated every time the predetermined time period elapses, and the operation of the chopper is stopped when the estimated temperature increase value is higher than the upper limit value. Therefore, a small-capacitance capacitor can be used, and thus, the device can be reduced in size and cost.

BRIEF DESCRIPTION OF DRAWINGS

FIG. 7 illustrates results of an experiment described with reference to FIGS. 5 and 6.

DESCRIPTION OF EMBODIMENTS

First Embodiment

Figure 1:
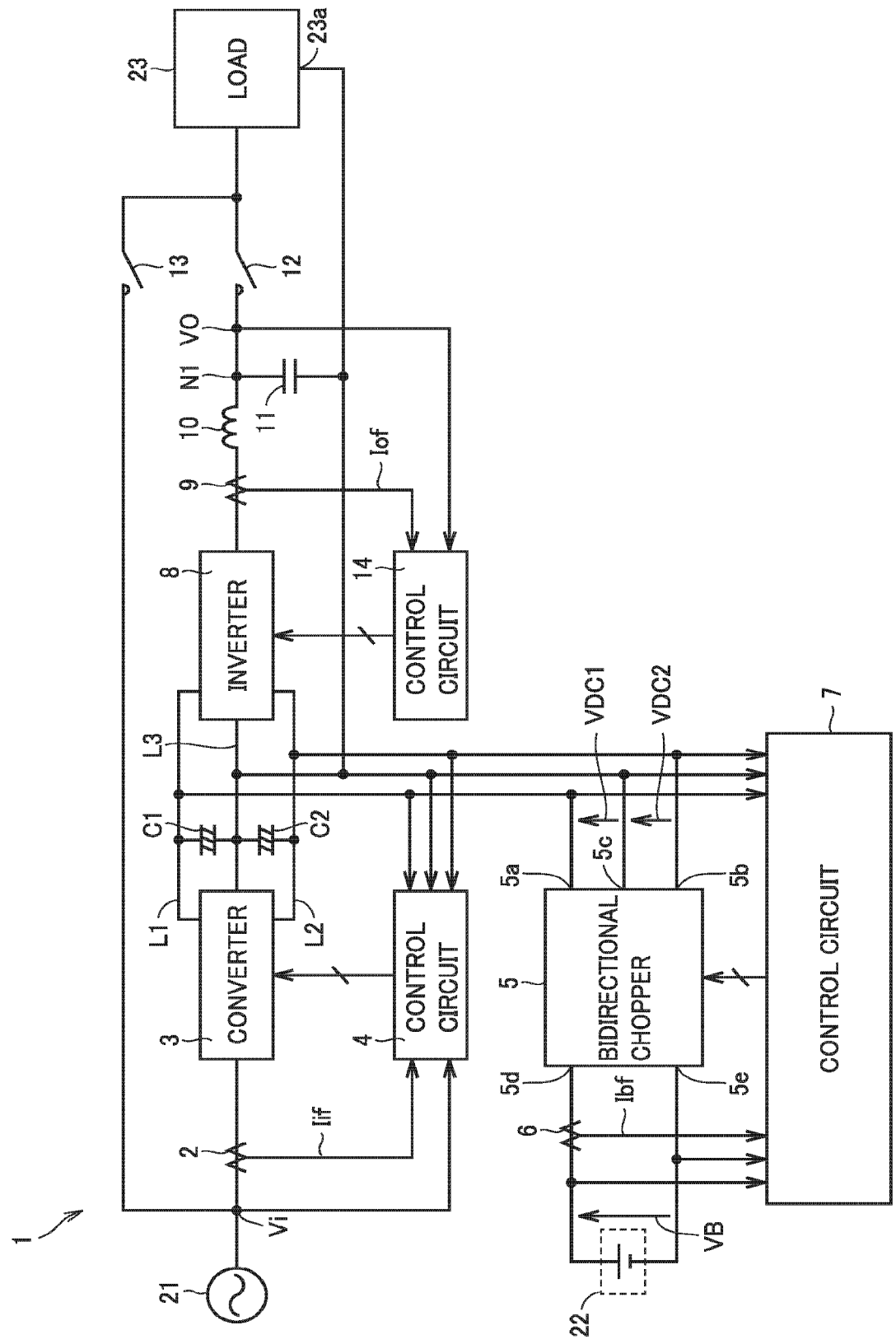
FIG. 1 is a circuit block diagram showing a configuration of an uninterruptible power supply device according to a first embodiment.

FIG. 1 is a circuit block diagram showing a configuration of an uninterruptible power supply device 1 according to a first embodiment. In FIG. 1, uninterruptible power supply device 1 includes current detectors 2, 6 and 9, a converter 3, DC lines L1 to L3, capacitors C1, C2 and 11, control circuits 4, 7 and 14, a bidirectional chopper 5, an inverter 8, a reactor 10, and electromagnetic contactors 12 and 13.

Uninterruptible power supply device 1 is driven by AC power of a commercial frequency supplied from a commercial AC power supply 21. An instantaneous value of an AC input voltage Vi supplied from commercial AC power supply 21 is detected by control circuit 4. Current detector 2 detects an AC input current Ii flowing from commercial AC power supply 21 to converter 3, and provides a signal Iif indicating the detected value to control circuit 4.

Converter 3 (conversion unit) is controlled by control circuit 4. When the AC power is normally supplied from commercial AC power supply 21 (when commercial AC power supply 21 is normal), converter 3 converts the AC power into DC power and outputs the DC power to DC lines L1, L2 and L3. When supply of the AC power from commercial AC power supply 21 is stopped (when a power failure of commercial AC power supply 21 occurs), an operation of converter 3 is stopped.

When commercial AC power supply 21 is normal, converter 3 generates three-level DC voltages Vdc1, Vdc2 and Vdc3 based on AC voltage Vi supplied from commercial AC power supply 21, and outputs DC voltages Vdc1 to Vdc3 to DC lines L1 to L3, respectively. DC voltage Vdc1 is a positive voltage, DC voltage Vdc2 is a negative voltage, and DC voltage Vdc3 is a ground voltage (0 V). VDC1=Vdc1−Vdc3, VDC2=Vdc3−Vdc2, and VDC1=VDC2. Assuming that Vdc1−Vdc2=VDC, VDC1+VDC2=VDC.

Capacitor C1 is connected between DC lines L1 and L3, to smooth DC voltage VDC1 between DC lines L1 and L3. Capacitor C2 is connected between DC lines L3 and L2, to smooth DC voltage VDC2 between DC lines L3 and L2. An instantaneous value of DC voltage VDC between DC lines L1 and L2 is detected by control circuit 4.

Control circuit 4 detects whether or not a power failure of commercial AC power supply 21 has occurred, based on a detected value of AC input voltage Vi. When commercial AC power supply 21 is normal, control circuit 4 controls converter 3 such that DC voltage VDC becomes equal to a predetermined reference DC voltage VDCr (e.g., 660 V), based on AC input voltage Vi, AC input current Ii and DC voltage VDC. When a power failure of commercial AC power supply 21 occurs, control circuit 4 stops the operation of converter 3.

DC lines L1, L2 and L3 are connected to inverter 8, and are connected to high-voltage-side nodes 5a, 5b and 5c of bidirectional chopper 5, respectively. Low-voltage-side nodes 5d and 5e of bidirectional chopper 5 are connected to a positive electrode and a negative electrode of a battery 22, respectively. Battery 22 (power storage device) stores DC power.

Bidirectional chopper 5 is controlled by control circuit 7. When commercial AC power supply 21 is normal, bidirectional chopper 5 stores the DC power generated by converter 3 in battery 22. In response to the occurrence of a power failure of commercial AC power supply 21, bidirectional chopper 5 supplies the DC power of battery 22 to inverter 8 through DC lines L1 to L3.

The instantaneous value of DC voltage VDC between DC lines L1 and L2 is detected by control circuit 7. The instantaneous value of DC voltage VDC between DC lines L1 and L2 may be obtained by adding an instantaneous value of DC voltage VDC1 between DC lines L1 and L3 and an instantaneous value of DC voltage VDC2 between DC lines L3 and L2.

Current detector 6 detects a DC current Ib flowing between low-voltage-side node 5d of bidirectional chopper 5 and the positive electrode of battery 22, and provides a signal Ibf indicating the detected value to control circuit 7. An instantaneous value of an inter-terminal voltage VB of battery 22 is detected by control circuit 7.

Control circuit 7 controls bidirectional chopper 5 based on DC voltage VDC, DC current Ib, and inter-terminal voltage VB of battery 22. Control circuit 7 determines whether or not a power failure of commercial AC power supply 21 has occurred, based on the polarity of DC current Ib.

When commercial AC power supply 21 is normal, control circuit 7 controls bidirectional chopper 5 such that the DC power generated by converter 3 is stored in battery 22 and inter-terminal voltage VB of battery 22 becomes equal to a predetermined reference DC voltage VBr (e.g., 480 V).

In addition, in response to the occurrence of a power failure of commercial AC power supply 21, control circuit 7 controls bidirectional chopper 5 such that the DC power of battery 22 is supplied to inverter 8 and DC voltage VDC between DC lines L1 and L2 becomes equal to predetermined reference DC voltage VDCr (e.g., 660 V).

In addition, control circuit 7 stores information indicating a relationship among DC current Ib, a time constant of a temperature increase of a capacitor included in bidirectional chopper 5, and a temperature increase saturation value of the capacitor. At the time of a power failure of commercial AC power supply 21, based on DC current Ib and the stored information, control circuit 7 calculates an estimated temperature increase value of the capacitor every time a predetermined time period elapses, and stops an operation of bidirectional chopper 5 when the calculated estimated temperature increase value exceeds an upper limit value.

Inverter 8 is controlled by control circuit 14, and converts the DC power supplied from converter 3 or bidirectional chopper 5 through DC lines L1 to L3 into AC power of a commercial frequency and outputs the AC power. That is, inverter 8 converts the DC power supplied from converter 3 through DC lines L1 to L3 into AC power when commercial AC power supply 21 is normal, and converts the DC power supplied from battery 22 through bidirectional chopper 5 into AC power in response to the occurrence of a power failure of commercial AC power supply 21. An AC output voltage of inverter 8 can be controlled to a desired value.

At this time, inverter 8 generates an AC output voltage Vo based on DC voltages Vdc1 to Vdc3 of DC lines L1 to L3. Based on AC output voltage Vo and an AC output current Io, control circuit 14 controls inverter 8 such that AC output voltage Vo becomes equal to a predetermined reference AC voltage Vor.

An output node of inverter 8 is connected to one terminal of reactor 10, and the other terminal (node N1) of reactor 10 is connected to a load 23 with electromagnetic contactor 12 being interposed. Capacitor 11 is connected between node N1 and DC line L3. A ground terminal 23a of load 23 is connected to DC line L3.

Reactor 10 and capacitor 11 constitute a low pass filter, which allows the AC power of a commercial frequency generated by inverter 8 to pass through load 23, and prevents a signal of a switching frequency generated in inverter 8 from passing through load 23. Inverter 8, reactor 10 and capacitor 11 constitute an inversion unit. Inverter 8, reactor 10, capacitor 11, and load 23 (AC load) constitute a DC load.

Current detector 9 detects an instantaneous value of output current Io of inverter 8, and provides a signal Iof indicating the detected value to control circuit 14. An instantaneous value of AC output voltage Vo appearing at node N1 is detected by control circuit 14. Based on AC output voltage Vo and AC output current Io, control circuit 14 controls inverter 8 such that AC output voltage Vo becomes equal to predetermined reference AC voltage Vor.

Electromagnetic contactor 12 is turned on in an inverter power feeding mode in which the AC power generated by inverter 8 is supplied to load 23, and is turned off in a bypass power feeding mode in which the AC power from commercial AC power supply 21 is supplied to load 23.

Electromagnetic contactor 13 is connected between commercial AC power supply 21 and load 23. Electromagnetic contactor 13 is turned off in the inverter power feeding mode, and is turned on in the bypass power feeding mode. When inverter 8 fails in the inverter power feeding mode, electromagnetic contactor 13 is turned on and electromagnetic contactor 12 is turned off, such that the AC power from commercial AC power supply 21 is supplied to load 23.

Figure 2:
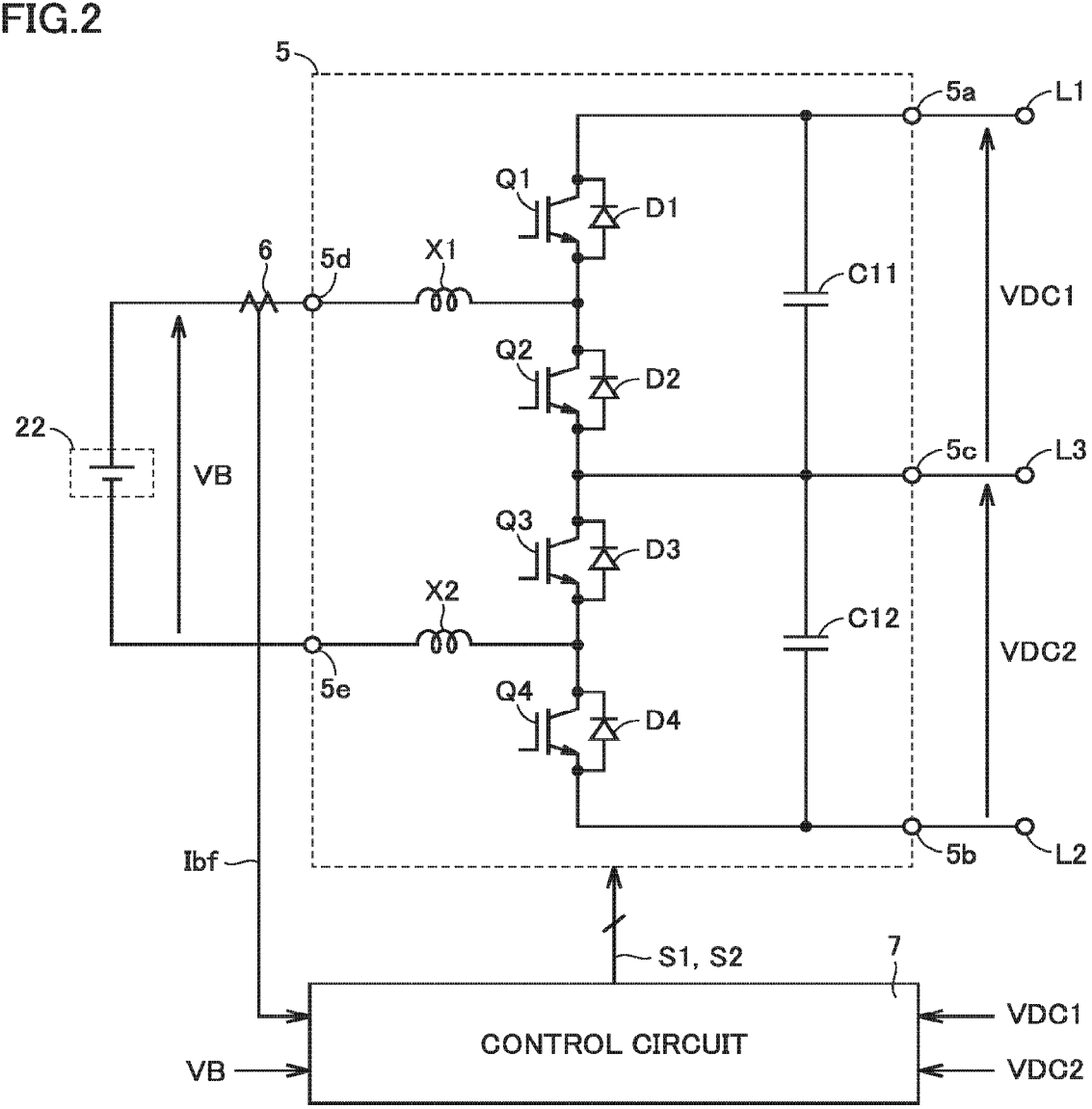
FIG. 2 is a circuit diagram showing a configuration of a bidirectional chopper shown in FIG. 1.

FIG. 2 is a circuit diagram showing a configuration of bidirectional chopper 5. In FIG. 2, bidirectional chopper 5 includes IGBTs Q1 to Q4, diodes D1 to D4, reactors X1 and X2, and capacitors C11 and C12.

A collector of IGBT Q1 is connected to high-voltage-side node 5a, and an emitter thereof is connected to low-voltage-side node 5d with reactor X1 being interposed, and is connected to a collector of IGBT Q2. An emitter of IGBT Q2 is connected to high-voltage-side node 5c and is connected to a collector of IGBT Q3. An emitter of IGBT Q3 is connected to low-voltage-side node 5e with reactor X2 being interposed, and is connected to a collector of IGBT Q4. An emitter of IGBT Q4 is connected to high-voltage-side node 5b.

Diodes D1 to D4 are connected in antiparallel to IGBTs Q1 to Q4, respectively. Capacitor C11 is connected between high-voltage-side nodes 5a and 5c, to stabilize DC voltage VDC1 between high-voltage-side nodes 5a and 5c. Capacitor C12 is connected between high-voltage-side nodes 5c and 5b, to stabilize DC voltage VDC2 between high-voltage-side nodes 5c and 5b.

When commercial AC power supply 21 is normal, IGBT Q1 (first switching element) and IGBT Q4 (fourth switching element) are turned on and off at a predetermined frequency, to store the DC power generated by converter 3 in battery 22. When commercial AC power supply 21 is normal, IGBTs Q2 and Q3 are fixed in the off state.

IGBTs Q1 and Q4 are controlled by a gate signal S1 from control circuit 7. Gate signal S1 is alternately set to an "H" level and an "L" level at a predetermined frequency. When gate signal S1 is set to the "H" level, IGBTs Q1 and Q4 are turned on. When gate signal S1 is set to the "L" level, IGBTs Q1 and Q4 are turned off.

In the normal state of commercial AC power supply 21, when IGBTs Q1 and Q4 are turned on in the case of VDC>VB, current Ib flows along a route from DC line L1 through IGBT Q1, reactor X1, battery 22, reactor X2, and IGBT Q4 to DC line L2, such that battery 22 is charged and electromagnetic energy is stored in reactors X1 and X2.

When IGBTs Q1 and Q4 are turned off, a current flows along a route from one terminal (terminal on the battery 22 side) of reactor X1 through battery 22, reactor X2, and diodes D3 and D2 to the other terminal of reactor X1, such that battery 22 is charged and the electromagnetic energy of reactors X1 and X2 is released.

A ratio between a time period during which gate signal S1 is in the "H" level (pulse width) and one period is called "duty ratio". By adjusting a duty ratio of gate signal S1, inter-terminal voltage VB of battery 22 can be adjusted to predetermined reference DC voltage VBr. DC voltage VDC=VDC1+VDC2 between DC lines L1 and L2 is stepped down and provided to battery 22, and VB<VDC is attained.

In response to the occurrence of a power failure of commercial AC power supply 21, IGBT Q2 (second switching element) and IGBT Q3 (third switching element) are turned on and off at a predetermined frequency, to supply the DC power of battery 22 to inverter 8.

IGBTs Q2 and Q3 are controlled by a gate signal S2 from control circuit 7. Gate signal S2 is alternately set to an "H" level and an "L" level at a predetermined frequency. When gate signal S2 is set to the "H" level, IGBTs Q2 and Q3 are turned on. When gate signal S2 is set to the "L" level, IGBTs Q2 and Q3 are turned off.

When supply of the AC power from commercial AC power supply 21 is stopped and DC voltage VDC between DC lines L1 and L2 becomes lower than inter-terminal voltage VB of battery 22, IGBTs Q1 and Q4 are fixed in the off state, and on and off of IGBTs Q2 and Q3 are started.

When IGBTs Q2 and Q3 are turned on, a current flows from the positive electrode of battery 22 through reactor X1, IGBTs Q2 and Q3, and reactor X2 to the negative electrode of battery 22, such that electromagnetic energy is stored in reactors X1 and X2. When IGBTs Q2 and Q3 are turned off, the current flowing from reactor X1 to IGBT Q2 is commutated from reactor X1 to diode D1 and flows to the negative electrode of battery 22 through capacitors C11 and C12, diode D4, and reactor X2, such that capacitors C11 and C12 are charged and the electromagnetic energy of reactors X1 and X2 is released.

A ratio between a time period during which gate signal S2 is in the "H" level (pulse width) and one period is called "duty ratio". By adjusting a duty ratio of gate signal S2, DC voltage VDC=VDC1+VDC2 between DC lines L1 and L2 can be adjusted to predetermined reference DC voltage VDCr. Inter-terminal voltage VB of battery 22 is boosted and provided between DC lines L1 and L2, and VB<VDC is attained.

IGBTs Q1 to Q4, diodes D1 to D4, and reactors X1 and X2 constitute a chopper that converts DC voltage VB into DC voltage VDC at the time of a power failure of commercial AC power supply 21. C11 and C12 constitute a capacitor that stabilizes an output voltage of the chopper.

Control circuit 7 detects whether or not a power failure of commercial AC power supply 21 has occurred, based on output signal Ibf of current detector 6. That is, when a power failure of commercial AC power supply 21 occurs, the operation of converter 3 is stopped, such that the DC power is supplied from capacitors C1, C2, C11, and C12 to inverter 8 and DC voltage VDC between DC lines L1 and L2 decreases. When VDC=VB is satisfied, a current does not flow through IGBTs Q1 and Q4 even if IGBTs Q1 and Q4 are turned on and off. Furthermore, when VDC<VB is satisfied, current Ib flows from the positive electrode of battery 22 through reactor X1, diode D1, capacitors C11 and C12, diode D4, and reactor X2 to the negative electrode of battery 22.

Therefore, when a power failure of commercial AC power supply 21 occurs, the polarity of current Ib flowing from low-voltage-side node 5d of bidirectional chopper 5 to the positive electrode of battery 22 is reversed. Assuming that the polarity of current Ib flowing from low-voltage-side node 5d of bidirectional chopper 5 to the positive electrode of battery 22 is negative, control circuit 7 detects the occurrence of a power failure of commercial AC power supply 21 when the polarity of current Ib is reversed from negative to positive. Current detector 6 may be provided in bidirectional chopper 5. For example, current detector 6 may detect current Ib flowing between the emitter of IGBT Q1 and reactor X1.

In such bidirectional chopper 5, when the DC power of battery 22 is supplied to inverter 8 at the time of a power failure of commercial AC power supply 21, a ripple current flows through capacitors C11 and C12 and the temperature of capacitors C11 and C12 increases. When a temperature increase value of capacitors C11 and C12 exceeds a predetermined upper limit value, thermal runaway occurs, which causes a breakage of capacitors C11 and C12. In order to suppress the temperature increase of capacitors C11 and C12, it is necessary to increase a capacitance value of capacitors C11 and C12.

Conventionally, the capacitance value of capacitors C11 and C12 has been set to prevent a temperature increase saturation value of capacitors C11 and C12 from exceeding an upper limit value when maximum current Ib flown at the time of a power failure of commercial AC power supply 21 is constantly flown. Therefore, the capacitance value of capacitors C11 and C12 has become excessive, and thus, the device has increased in size and cost. The first embodiment solves this problem.

Figure 3:
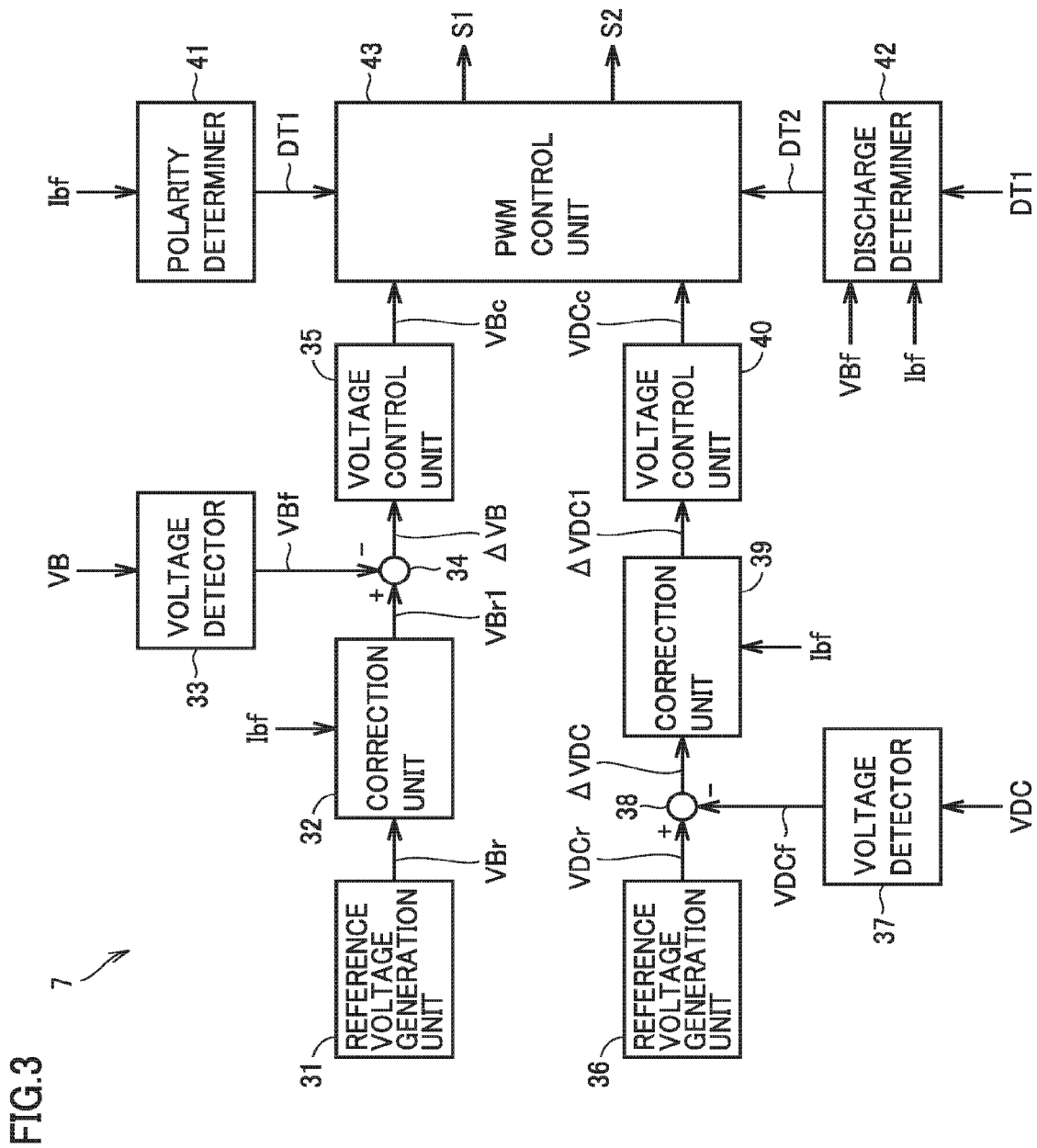
FIG. 3 is a block diagram showing a configuration of a control circuit 7 shown in FIG. 2.

FIG. 3 is a block diagram showing a configuration of control circuit 7. In FIG. 3, control circuit 7 includes reference voltage generation units 31 and 36, correction units 32 and 39, voltage detectors 33 and 37, subtractors 34 and 38, voltage control units 35 and 40, a polarity determiner 41, a discharge determiner 42, and a PWM (Pulse Width Modulation) control unit 43.

Reference voltage generation unit 31 generates reference DC voltage VBr, which is a target voltage of inter-terminal voltage VB of battery 22. Correction unit 32 operates based on output signal Igf of current detector 6 (FIG. 2), and corrects reference DC voltage VBr in accordance with current Ib flowing into battery 22 and outputs a reference voltage correction value VBr1. Correction unit 32 adjusts reference voltage correction value VBr1 while monitoring the magnitude of current Ib, in order to, for example, prevent excessive current Ib from flowing during initial charging of battery 22.

Voltage detector 33 detects inter-terminal voltage VB of battery 22 and outputs a signal VBf indicating the detected value. Subtractor 34 determines a difference $\Delta VB = VBr1 - VB$ between reference voltage correction value VBr1 and inter-terminal voltage VB of battery 22 indicated by output signal VBf of voltage detector 33. Voltage control unit 35 adds a value proportional to difference $\Delta VB$ and an integral value of difference $\Delta VB$ to generate a voltage command value VBc.

Correction unit 32, subtractor 34 and voltage control unit 35 constitute a first voltage command unit that generates voltage command value VBc such that inter-terminal voltage VB of battery 22 becomes equal to reference DC voltage VBr.

Reference voltage generation unit 36 generates reference DC voltage VDCr, which is a target voltage of DC voltage VDC between DC lines L1 and L2. Voltage detector 37 detects DC voltage VDC between DC lines L1 and L2, and outputs a signal VDCf indicating the detected value. Subtractor 38 determines a difference $\Delta VDC = VDCr - VDC$ between reference DC voltage VDCr and DC voltage VDC indicated by output signal VDCf of voltage detector 37.

Correction unit 39 operates based on output signal Ibf of current detector 6 (FIG. 2), and corrects difference $\Delta VDC$ in accordance with the magnitude of current Ib flowing out of battery 22 and outputs a difference correction value $\Delta VDC1$. Correction unit 39 adjusts difference correction value $\Delta VDC1$ while monitoring the magnitude of current Ib, in order to, for example, prevent excessive current Ib from flowing during initial discharging of battery 22. Voltage control unit 40 adds a value proportional to difference correction value $\Delta VDC1$ and an integral value of difference correction value $\Delta VDC1$ to generate a voltage command value VDCc.

Subtractor 38, correction unit 39 and voltage control unit 40 constitute a second voltage command unit that generates voltage command value VDCc such that DC voltage VDC between DC lines L1 and L2 becomes equal to reference DC voltage VDCr.

Polarity determiner 41 determines the polarity of DC current Ib flowing between low-voltage-side node 5d of bidirectional chopper 5 and the positive electrode of battery 22, based on output signal Ibf of current detector 6 (FIG. 2), and outputs a signal DT1 indicating the determination result.

When DC current Ib flows from low-voltage-side node 5d of bidirectional chopper 5 toward the positive electrode of battery 22 (when commercial AC power supply 21 is normal), DC current Ib is determined as having a negative polarity and signal DT1 is set to an "L" level. In contrast, when DC current Ib flows from the positive electrode of battery 22 toward low-voltage-side node 5d of bidirectional chopper 5 (at the time of a power failure of commercial AC power supply 21), DC current Ib is determined as having a positive polarity and signal DT1 is set to an "H" level.

When signal DT1 is in the "H" level (at the time of a power failure of commercial AC power supply 21), discharge determiner 42 determines whether or not the DC power of battery 22 can be discharged, based on output signal VBf of voltage detector 33 and output signal Ibf of current detector 6 (FIG. 1, FIG. 2), and outputs a signal DT2 indicating the determination result. When the DC power of battery 22 can be discharged, signal DT2 is set to the "H" level. When the DC power of battery 22 cannot be discharged, signal DT2 is set to the "L" level.

Figure 4:
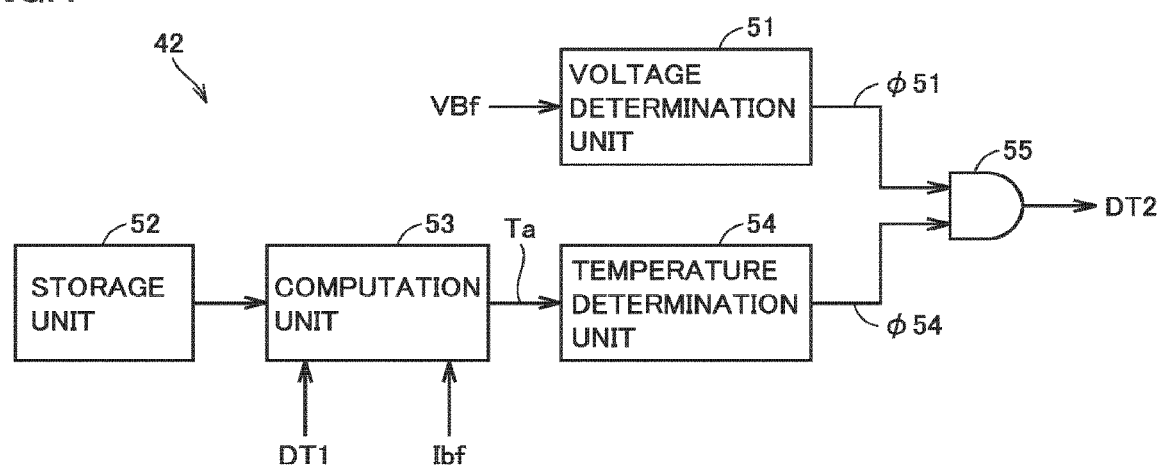
FIG. 4 is a block diagram showing a configuration of a discharge determiner shown in FIG. 3.

FIG. 4 is a block diagram showing a configuration of discharge determiner 42. In FIG. 4, discharge determiner 42 includes a voltage determination unit 51, a storage unit 52, a computation unit 53, a temperature determination unit 54, and an AND gate 55.

Voltage determination unit 51 compares levels of DC voltage VB indicated by output signal VBf of voltage detector 33 (FIG. 3) and a discharge end voltage VBE of battery 22 (FIG. 1, FIG. 2), and outputs a signal $\phi 51$ indicating the comparison result. When DC voltage VB is higher than discharge end voltage VBE, signal $\phi 51$ is set to the "H" level. When DC voltage VB is lower than discharge end voltage VBE, signal $\phi 51$ is set to the "L" level.

Information indicating a relationship among DC current Ib at the time of a power failure of commercial AC power supply 21, a time constant $\tau$ of the temperature increase of capacitors C11 and C12, and a temperature increase saturation value Ts of capacitors C11 and C12 is stored in storage unit 52.

Figure 5:
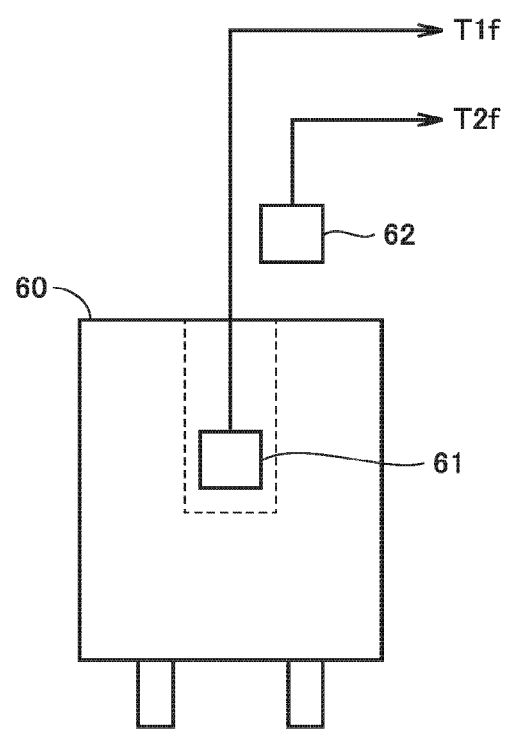
FIG. 5 is a diagram for illustrating contents stored in a storage unit shown in FIG. 4.

An experimental method for obtaining the information indicating the relationship among Ib, $\tau$ and Ts will now be described. Each of capacitors C11 and C12 includes a plurality of electrolytic capacitors connected in parallel. As shown in FIG. 5, an electrolytic capacitor 60 (e.g., an electrolytic capacitor arranged at the center, of the plurality of electrolytic capacitors) having the maximum temperature increase is selected from those electrolytic capacitors, and a temperature sensor 61 is arranged inside selected electrolytic capacitor 60 to detect an internal temperature T1 of electrolytic capacitor 60.

In addition, a temperature sensor 62 is arranged outside selected electrolytic capacitor 60 to detect an ambient temperature T2 of electrolytic capacitor 60. A difference between internal temperature T1 of electrolytic capacitor 60 indicated by an output signal T1f of temperature sensor 61 and ambient temperature T2 of electrolytic capacitor 60 indicated by an output signal T2f of temperature sensor 62 is defined as a temperature increase value $T = T1 - T2$ of electrolytic capacitor 60.

Since electrolytic capacitor 60 in which temperature sensor 61 is arranged has a short life, it is actually impossible to detect internal temperature T1 of electrolytic capacitor 60 while operating uninterruptible power supply device 1.

In addition, load 23 having a specific capacity (e.g., 400 kW) is connected to uninterruptible power supply device 1, and a DC power supply that can adjust output voltage VB is connected instead of battery 22. Output voltage VB of the DC power supply is set at a predetermined value, and bidirectional chopper 5 and inverter 8 are operated as in a power failure of commercial AC power supply 21.

DC current Ib is detected by current detector 6, and temperature increase value T (K) of electrolytic capacitor 60 is detected by temperature sensors 61 and 62. Temperature increase value T (K) increases gradually with the passage of time. Therefore, the operation of bidirectional chopper 5 and inverter 8 is continued until temperature increase value T (K) is saturated, and a curve indicating a temporal change in temperature increase value T (K) is drawn.

Figure 6:
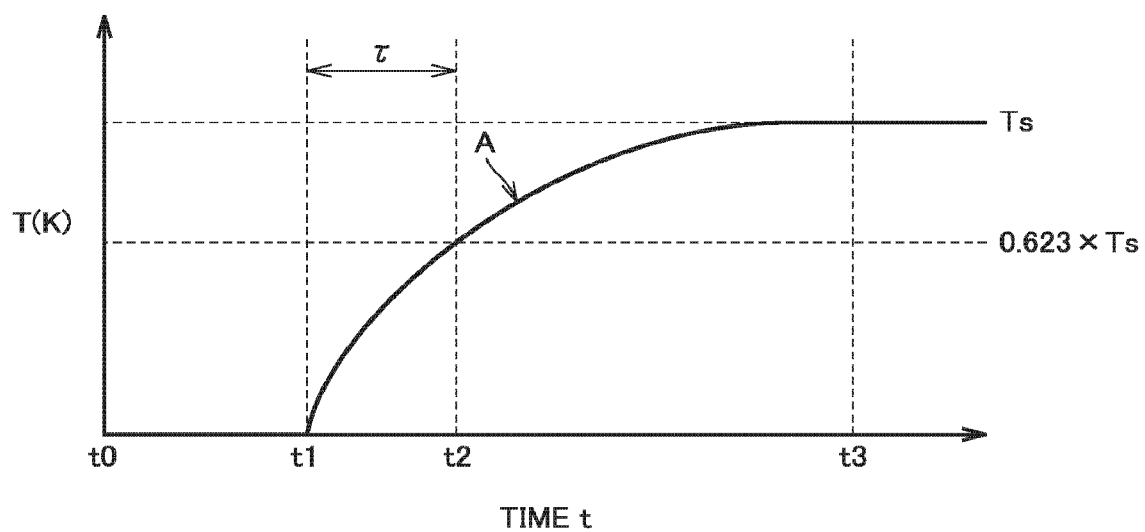
FIG. 6 is a time chart showing a temporal change in temperature increase value of an electrolytic capacitor shown in FIG. 5.

FIG. 6 is a time chart showing the temporal change in temperature increase value T (K) of electrolytic capacitor 60. In FIG. 6, in an initial state (time t0), Ib=0 (A) and T=0 (k). DC voltage VB is set at a predetermined value. When the operation of bidirectional chopper 5 and inverter 8 is started at time t1, DC current Ib flows and temperature increase value T (K) increases gradually. At time t3, temperature increase value T (K) is saturated and reaches a temperature increase saturation value Ts (K).

A time period until temperature increase value T (K) reaches a value of 62.3(%) of temperature increase saturation value Ts (K) from 0 (k) is defined as time constant τ=t2−t1. DC voltage VB is changed in a plurality of stages, a temperature increase curve A is drawn for each DC voltage VB, and DC voltage VB (V), DC current Ib, temperature increase saturation value Ts, and time constant t are recorded.

FIG. 7 illustrates experimental results described with reference to FIGS. 5 and 6. FIG. 7 shows the case in which consumed power PL of load 23 is fixed at 400 (kW) and DC voltage VB is changed in four stages of 400, 420, 440, and 480 (V). When DC voltage VB is changed to 400, 420, 440, and 480 (V), DC current Ib becomes 1000.0, 952.4, 909.1, and 833.3 (A), respectively, and temperature increase saturation value Ts becomes 51, 48, 44, and 39 (K), respectively. Time constant r is about 15 minutes in all cases.

Figure 8:
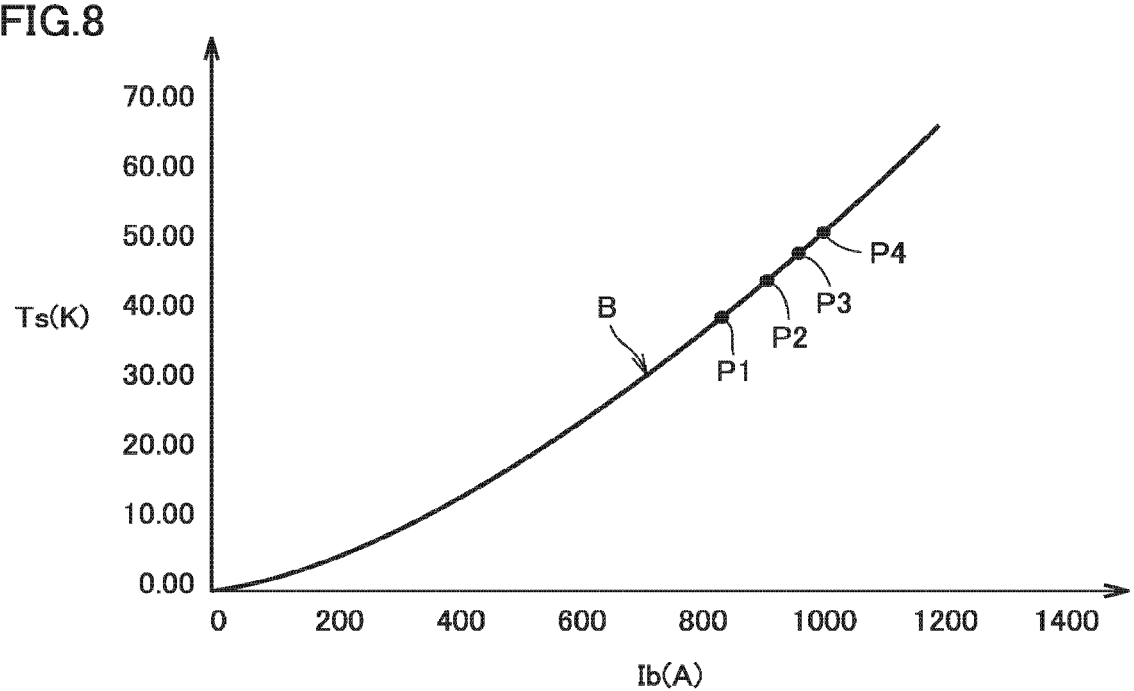
FIG. 8 shows a relationship between a DC current and a temperature increase saturation value shown in FIG. 7.

FIG. 8 shows a relationship between DC current Ib and temperature increase saturation value Ts shown in FIG. 7. In FIG. 8, a curve B passes through an origin point (Ib=0, Ts=0) and four points, i.e., a point P1 (Ib=833.3, Ts=39), a point P2 (Ib=909.1, Ts=44), a point P3 (Ib=952.4, Ts=48), and a point P4 (Ib=1000.0, Ts=51). A function of temperature increase saturation value Ts and DC current Ib can be approximated by a formula Ts=f(Ib). The formula Ts=f(Ib) and time constant τ are stored in storage unit 52.

Referring again to FIG. 4, computation unit 53 is activated when signal DT1 is in the "H" level (at the time of a power failure of commercial AC power supply 21), and calculates an estimated temperature increase value Ta of capacitors C11 and C12 every predetermined time period Δt, based on DC current Ib indicated by output signal Ibf of current detector 6 and the contents stored in storage unit 52.

Figure 9:
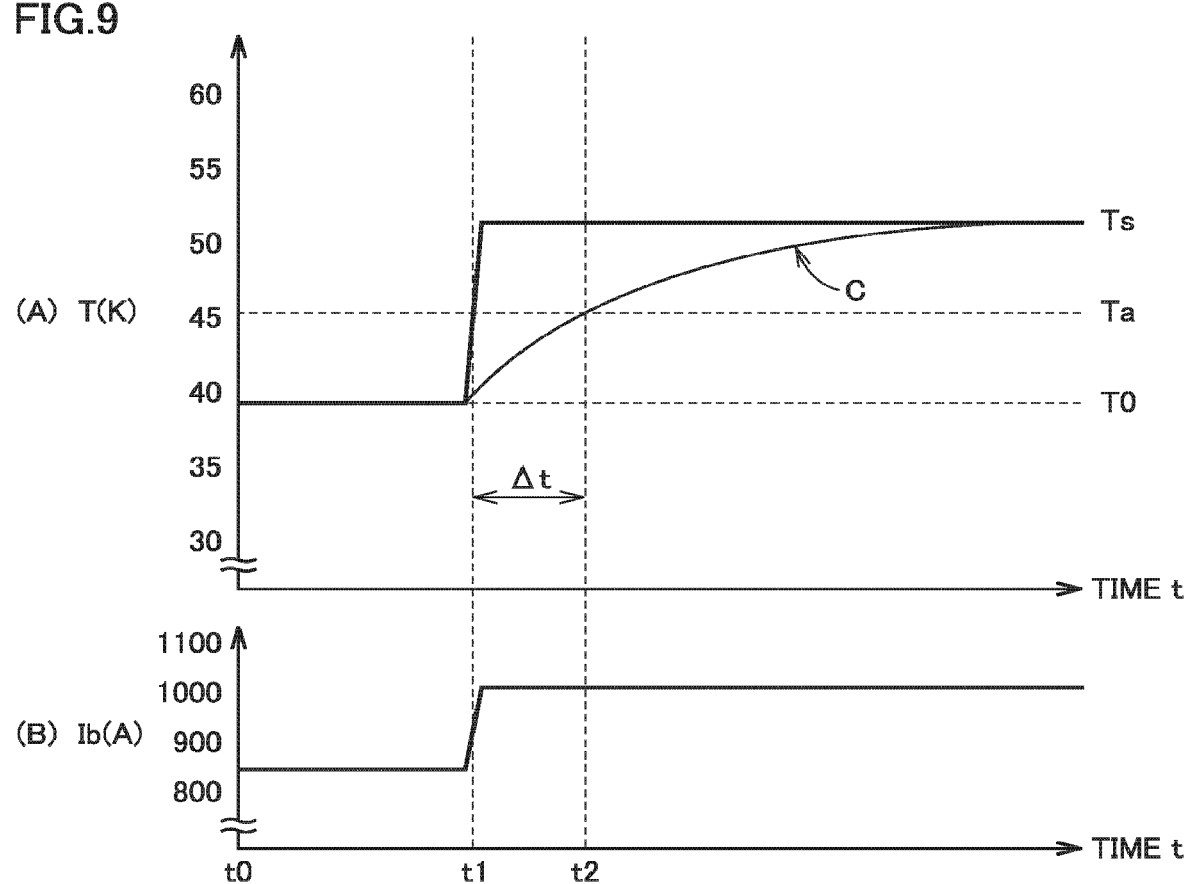
FIG. 9 is a time chart for illustrating an operation of a computation unit shown in FIG. 4.

FIG. 9 is a time chart for illustrating an operation of computation unit 53. In FIG. 9, (A) shows a temporal change in temperature increase value T (K) of capacitors C11 and C12, and (B) shows a temporal change in DC current Ib (A).

FIG. 9 shows the case in which DC current Ib of 833.3 (A) is flown at time t0 and DC current Ib is increased to 1000 (A) at time t1 subsequent to time t0. At time t0, temperature increase value T0 (K) of capacitors C11 and C12 is 39 (K). Computation unit 53 calculates estimated temperature increase value Ta at time t2 after predetermined time period Δt elapses from time t1.

That is, computation unit 53 first calculates temperature increase saturation value Ts=f(1000)=51 (K) from DC current Ib=1000 (A) at time t1. Temperature increase value T (K) is estimated to increase along a curve C indicated by time constant τ toward calculated temperature increase saturation value Ts=51 (K). Computation unit 53 calculates estimated temperature increase value Ta at time t2 in accordance with the following formula (1). N is a positive integer and is incremented (+1) every time a calculation is performed once.

$$Ta = T0 + (Ts - T0) \times [1 - \exp(-\Delta t \times N/\tau)] \quad (1)$$

Temperature determination unit 54 compares levels of estimated temperature increase value Ta calculated by computation unit 53 and an upper limit value Th, and outputs a signal φ54 indicating the comparison result. When estimated temperature increase value Ta is smaller than upper limit value Th, signal φ54 is set to an "H" level. When estimated temperature increase value Ta is larger than upper limit value Th, signal φ54 is set to an "L" level. Upper limit value Th is, for example, 45 (K).

AND gate 55 outputs AND signal DT2 of signals φ51 and φ54. When DC voltage VB is higher than discharge end voltage VBE and estimated temperature increase value Ta is lower than upper limit value Th, signal DT2 is set to the "H" level and discharging of battery 22 is permitted. When DC voltage VB becomes lower than discharge end voltage VBE or when estimated temperature increase value Ta becomes higher than upper limit value Th, signal DT2 is set to the "L" level and discharging of battery 22 is prohibited.

Figure 10:
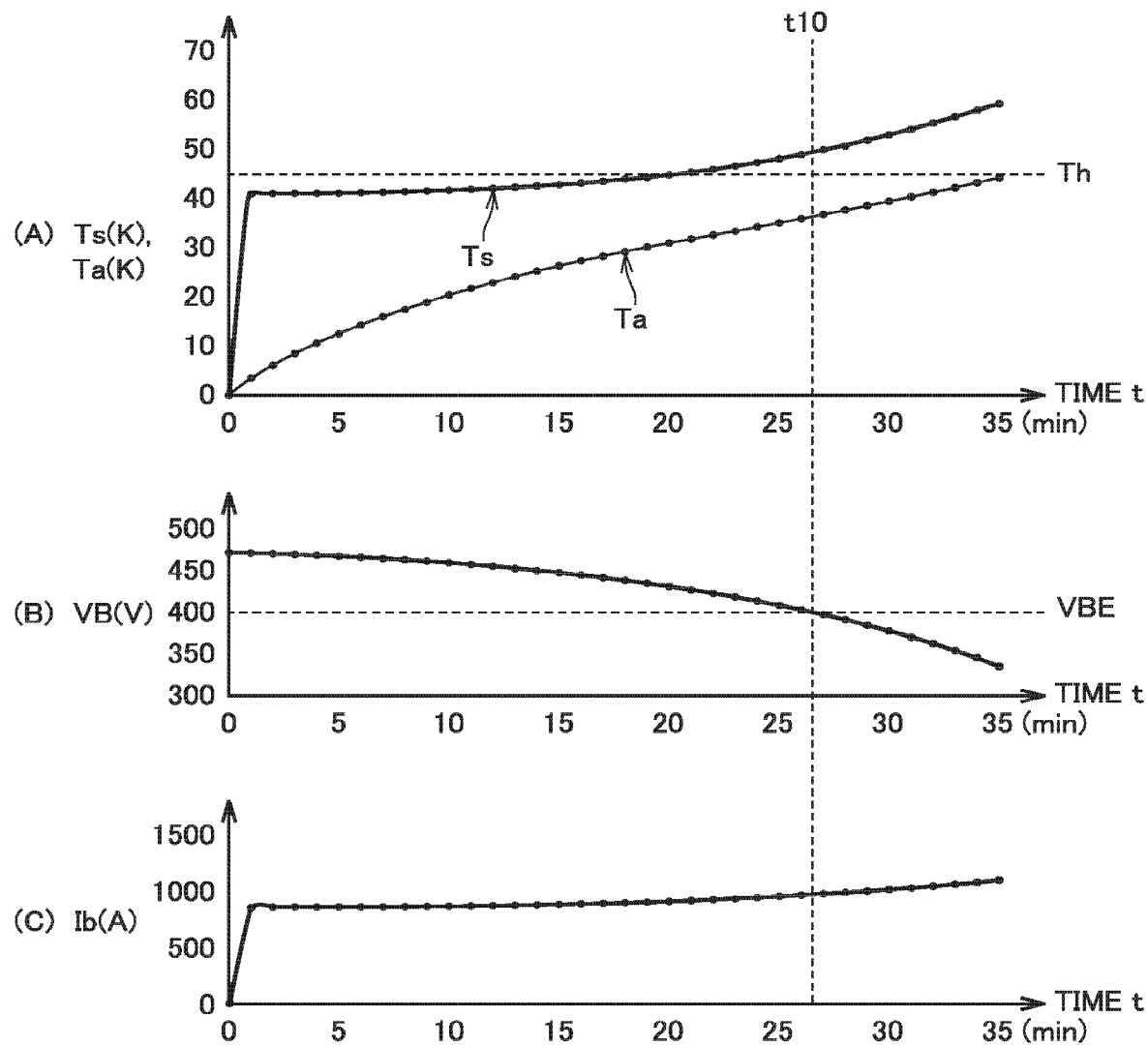
FIG. 10 is a time chart for illustrating an operation of the discharge determiner shown in FIG. 4.

FIG. 10 is a time chart for illustrating an operation of discharge determiner 42. In FIG. 10, (A) shows a temporal change in temperature increase saturation value Ts and estimated temperature increase value Ta, (B) shows a temporal change in inter-terminal voltage VB (DC voltage VB) of battery 22, and (C) shows a temporal change in discharging current Ib (DC current Ib) of battery 22. The horizontal axis in FIG. 10 represents the discharging time of battery 22.

In FIG. 10, when discharging of battery 22 is started, inter-terminal voltage VB of battery 22 decreases gradually from an initial value (e.g., 470 V). Since the consumed power of load 23 has a fixed value (e.g., 400 kW), discharging current Ib of battery 22 increases gradually from an initial value (e.g., 851 A) as inter-terminal voltage VB of battery 22 decreases.

Computation unit 53 calculates temperature increase saturation value Ts and estimated temperature increase value Ta every predetermined time period Δt (e.g., one minute). Since discharging current Ib of battery 22 increases gradually, temperature increase saturation value Ts also increases gradually from an initial value (e.g., 40 K). Estimated temperature increase value Ta increases gradually from an initial value (0 K).

In the case shown in FIG. 10, estimated temperature increase value Ta becomes higher than upper limit value Th (e.g., 45 K) when about 35 minutes elapse from the start of discharging, and inter-terminal voltage VB of battery 22 becomes lower than the discharge end voltage (e.g., 400 V) when about 26 minutes elapse from the start of discharging. Therefore, in this case, when about 26 minutes elapse from the start of discharging, output signal φ51 of voltage determination unit 51 (FIG. 4) is lowered to the "L" level and signal DT2 is lowered to the "L" level, and discharging of battery 22 is prohibited.

Referring again to FIG. 3, when output signal DT1 of polarity determiner 41 is in the "L" level (when commercial AC power supply 21 is normal), PWM control unit 43 generates gate signal S1 based on a result of comparison between voltage command value VBc from voltage control unit 35 and a triangular wave signal CW of a predetermined frequency, and fixes gate signal S2 to the "L" level.

When output signal DT1 of polarity determiner 41 is in the "H" level and output signal DT2 of discharge determiner 42 is in the "H" level (when DC voltage VB is higher than discharge end voltage VBE and estimated temperature increase value Ta is lower than upper limit value Th at the time of a power failure of commercial AC power supply 21), PWM control unit 43 generates gate signal S2 based on a result of comparison between voltage command value VDCc from voltage control unit 40 and triangular wave signal CW of a predetermined frequency, and fixes gate signal S1 to the "L" level.

When output signal DT1 of polarity determiner 41 is in the "H" level and output signal DT2 of discharge determiner 42 is in the "L" level (when DC voltage VB is lower than discharge end voltage VBE or when estimated temperature increase value Ta is higher than upper limit value Th at the time of a power failure of commercial AC power supply 21), PWM control unit 43 fixes gate signals S1 and S2 to the "L" level.

Figure 11:
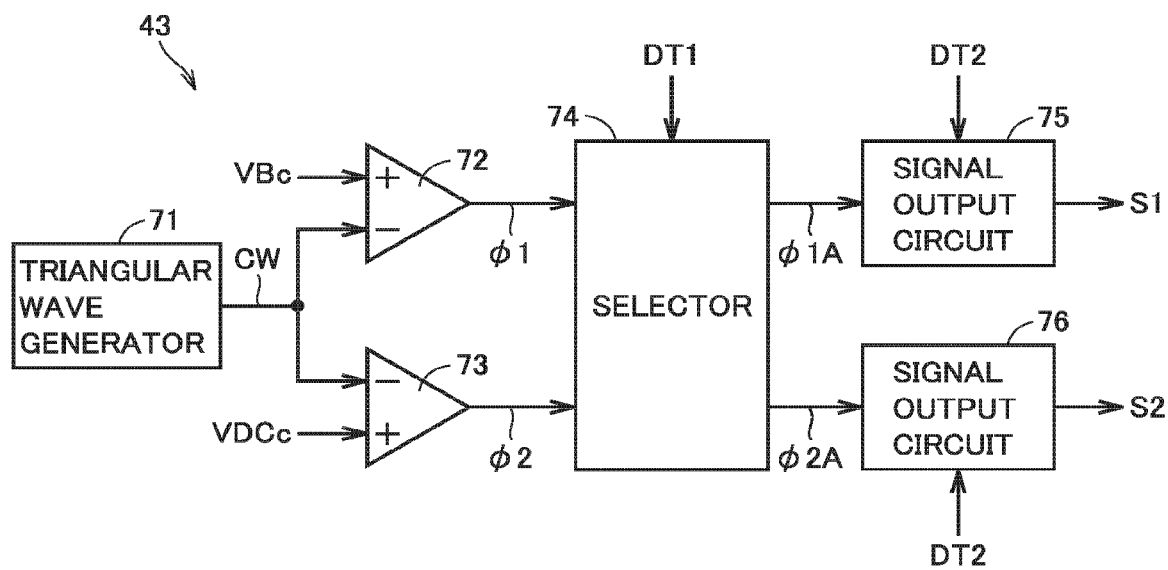
FIG. 11 is a block diagram showing a configuration of a PWM control unit shown in FIG. 3.

FIG. 11 is a block diagram showing a configuration of PWM control unit 43. In FIG. 11, PWM control unit 43 includes a triangular wave generator 71, comparators 72 and 73, a selector 74, and signal output circuits 75 and 76.

Triangular wave generator 71 generates triangular wave signal CW of a predetermined frequency. Comparator 72 compares levels of voltage command value VBc from voltage control unit 35 (FIG. 3) and triangular wave signal CW, and outputs a PWM signal φ1 indicating the comparison result. When VBc>CW, PWM signal φ1 is set to an "H" level. When VBc<CW, PWM signal φ1 is set to an "L" level.

Comparator 73 compares levels of voltage command value VDCc from voltage control unit 40 (FIG. 3) and triangular wave signal CW, and outputs a PWM signal φ2 indicating the comparison result. When VDCc>CW, PWM signal φ2 is set to an "H" level. When VDCc<CW, PWM signal φ2 is set to an "L" level.

When output signal DT1 of polarity determiner 41 (FIG. 3) is in the "L" level, selector 74 selects PWM signal φ1 of PWM signals φ1 and φ2 and provides selected PWM signal φ1 to signal output circuit 75 as a PWM signal φ1A, and provides a PWM signal φ2A fixed to the "L" level to signal output circuit 76.

When output signal DT1 of polarity determiner 41 (FIG. 3) is in the "H" level, selector 74 selects PWM signal φ2 of PWM signals φ1 and φ2 and provides selected PWM signal φ2 to signal output circuit 76 as PWM signal φ2A, and provides PWM signal φ1A fixed to the "L" level to signal output circuit 75.

Signal output circuit 75 is activated when signal DT2 is in the "H" level, performs amplification and level conversion processes on PWM signal φ1A from selector 74, generates gate signal S1 having the same waveform as that of PWM signal φ1A, and provides gate signal S1 to gates of IGBTs Q1 and Q4 of bidirectional chopper 5. When signal DT2 is in the "L" level, signal output circuit 75 fixes gate signal S1 to the "L" level.

Signal output circuit 76 is activated when signal DT2 is in the "H" level, performs amplification and level conversion processes on PWM signal φ2A from selector 74, generates gate signal S2 having the same waveform as that of PWM signal φ2A, and provides gate signal S2 to gates of IGBTs Q2 and Q3 of bidirectional chopper 5. When signal DT2 is in the "L" level, signal output circuit 76 fixes gate signal S2 to the "L" level.

Figure 12:
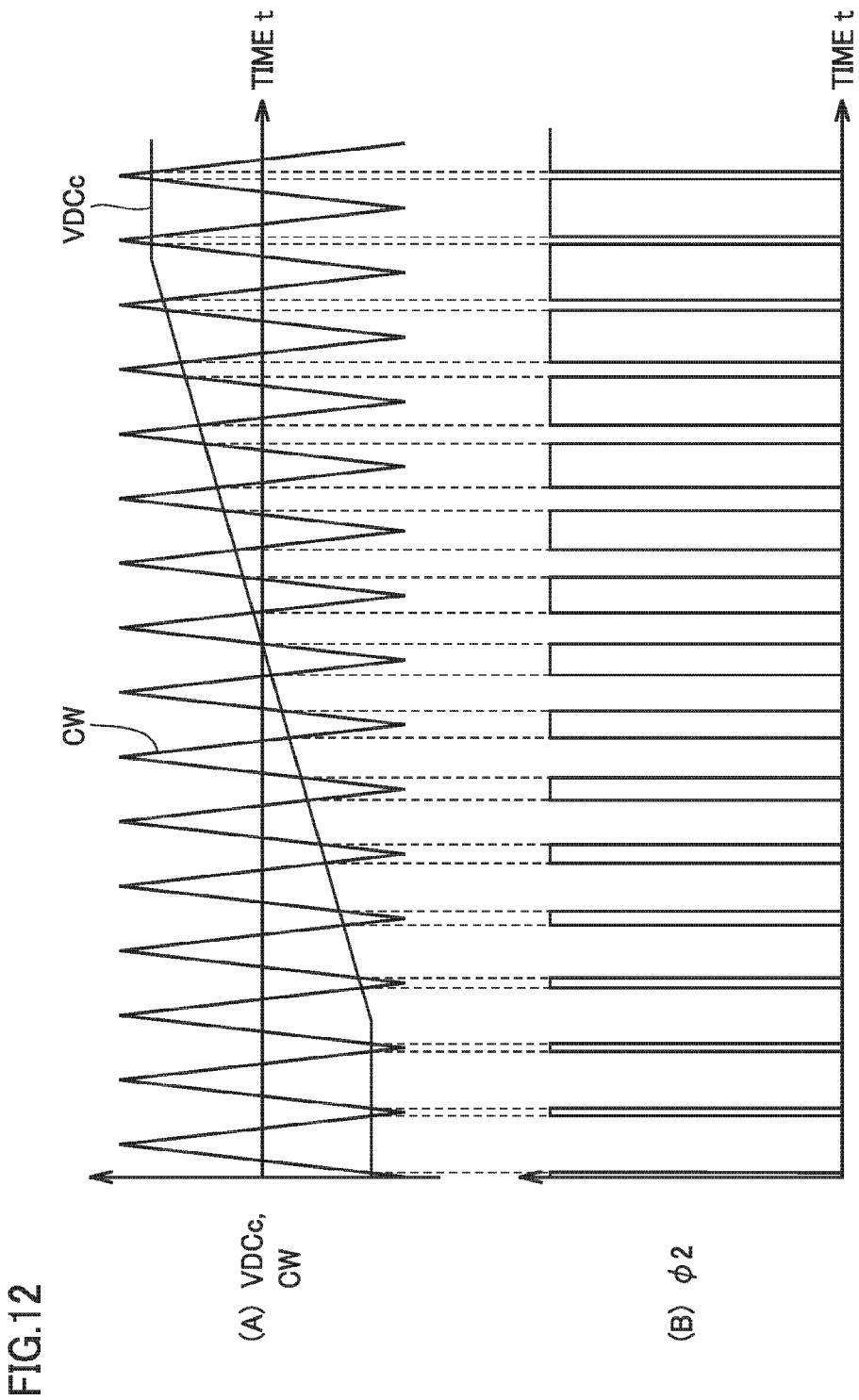
FIG. 12 is a time chart for illustrating an operation of the PWM control unit shown in FIG. 11.

FIG. 12 is a time chart for illustrating an operation of PWM control unit 43. In FIG. 12, (A) is a time chart showing waveforms of voltage command value VDCc, triangular wave signal CW and PWM signal φ2. As shown in FIG. 12(A), triangular wave signal CW changes at a specific frequency between a negative-side peak value and a positive-side peak value. Voltage command value VDCc changes between a negative-side peak value and a positive-side peak value. FIG. 12(A) shows the case in which voltage command value VDCc changes linearly from a negative value to a positive value.

As shown in FIGS. 12(A) and 12(B), PWM signal φ2 is set to the "H" level when voltage command value VDCc is larger than triangular wave signal CW, and PWM signal φ2 is set to the "L" level when voltage command value VDCc is smaller than triangular wave signal CW. Therefore, a duty ratio of PWM signal φ2 increases as voltage command value VDCc increases.

Since waveforms of voltage command value VBc, triangular wave signal CW and PWM signal φ1 are similar to those of voltage command value VDCc, triangular wave signal CW and PWM signal φ2, description thereof will not be repeated.

Next, an operation of uninterruptible power supply device 1 shown in FIGS. 1 to 12 will be described. Let us assume that the inverter power feeding mode is selected, electromagnetic contactor 12 is on, and electromagnetic contactor 13 is off. When commercial AC power supply 21 is normal, the AC power supplied from commercial AC power supply 21 is converted by converter 3 into DC power, which is converted by inverter 8 into AC power, which is supplied to load 23. Load 23 is thus operated.

In addition, a part of the DC power generated by converter 3 is stored in battery 22 by bidirectional chopper 5. At this time, in control circuit 7 (FIG. 3), voltage command value VBc is generated such that inter-terminal voltage VB of battery 22 becomes equal to reference DC voltage VBr, and signal DT1 is set to the "L" level by polarity determiner 41.

In PWM control unit 43 (FIG. 11), PWM signal φ1 indicating the result of comparison between triangular wave signal CW and voltage command value VBc is generated and gate signal S1 having the same waveform as that of PWN signal φ1 is generated. Based on gate signal S1, IGBTs Q1 and Q4 (FIG. 2) of bidirectional chopper 5 are turned on and off, and DC voltage VDC between DC lines L1 and L2 is stepped down and supplied to battery 22.

When a power failure of commercial AC power supply 21 occurs, the operation of converter 3 is stopped and the DC power of battery 22 is supplied by bidirectional chopper 5 to inverter 8 where the DC power is converted into AC power, which is supplied to load 23.

That is, when the operation of converter 3 is stopped and DC voltage VDC between DC lines L1 and L2 decreases, current Ib flows from the positive electrode of battery 22 toward low-voltage-side node 5d (FIG. 2) of bidirectional chopper 5, the polarity of current Ib is reversed from negative to positive, and output signal DT1 of polarity determiner 41 (FIG. 3) is set to the "H" level. In addition, in control circuit 7 (FIG. 3), voltage command value VDCc is generated such that DC voltage VDC between DC lines L1 and L2 becomes equal to reference DC voltage VDCr.

In PWM control unit 43 (FIG. 11), PWM signal φ2 indicating the result of comparison between triangular wave signal CW and voltage command value VDCc is generated, and gate signal S2 having the same waveform as that of PWM signal φ2 is generated. Based on gate signal S2, IGBTs Q2 and Q3 (FIG. 2) of bidirectional chopper 5 are turned on and off, and inter-terminal voltage VB of battery 22 is boosted and supplied to inverter 8 through DC lines L1 and L2.

When a power failure of commercial AC power supply 21 occurs, estimated temperature increase value Ta of capacitors C11 and C12 is calculated every predetermined time period Δt by computation unit 53 (FIG. 4). When calculated estimated temperature increase value Ta exceeds upper limit value Th, signal φ54 is lowered to the "L" level by temperature determination unit 54, and signal DT2 is lowered to the "L" level.

When inter-terminal voltage VB of battery 22 becomes lower than discharge end voltage VBE, signal φ51 is lowered to the "L" level by temperature determination unit 54, and signal DT2 is lowered to the "L" level. When signal DT2 is lowered to the "L" level, signals S1 and S2 are fixed to the "L" level by signal output circuits 75 and 76 and discharging of battery 22 is stopped.

As described above, in the first embodiment, based on the detection result by current detector 6 and the contents stored in storage unit 52, estimated temperature increase value Ta of capacitors C11 and C12 is calculated every time predetermined time period Δt elapses, and when calculated estimated temperature increase value Ta is higher than upper limit value Th, the operation of bidirectional chopper 5 is stopped. Therefore, smaller-capacitance capacitors C11 and C12 can be used as compared with the conventional art, and thus, the device can be reduced in size and cost.

Although the first embodiment describes the case in which capacitors C1 and C2 for stabilizing the output voltage of converter 3 and capacitors C11 and C12 for stabilizing the output voltage of bidirectional chopper 5 are provided separately, the present invention is not limited thereto. The same effect is obtained even when capacitors C1 and C2 include capacitors C11 and C12. However, each of capacitors C1 and C2 includes a plurality of electrolytic capacitors connected in parallel, and thus, it is necessary to select electrolytic capacitor 60 (FIG. 5) having the maximum temperature increase from those electrolytic capacitors, and detect internal temperature T1 of selected electrolytic capacitor 60 and ambient temperature T2.

Second Embodiment

Figure 13:
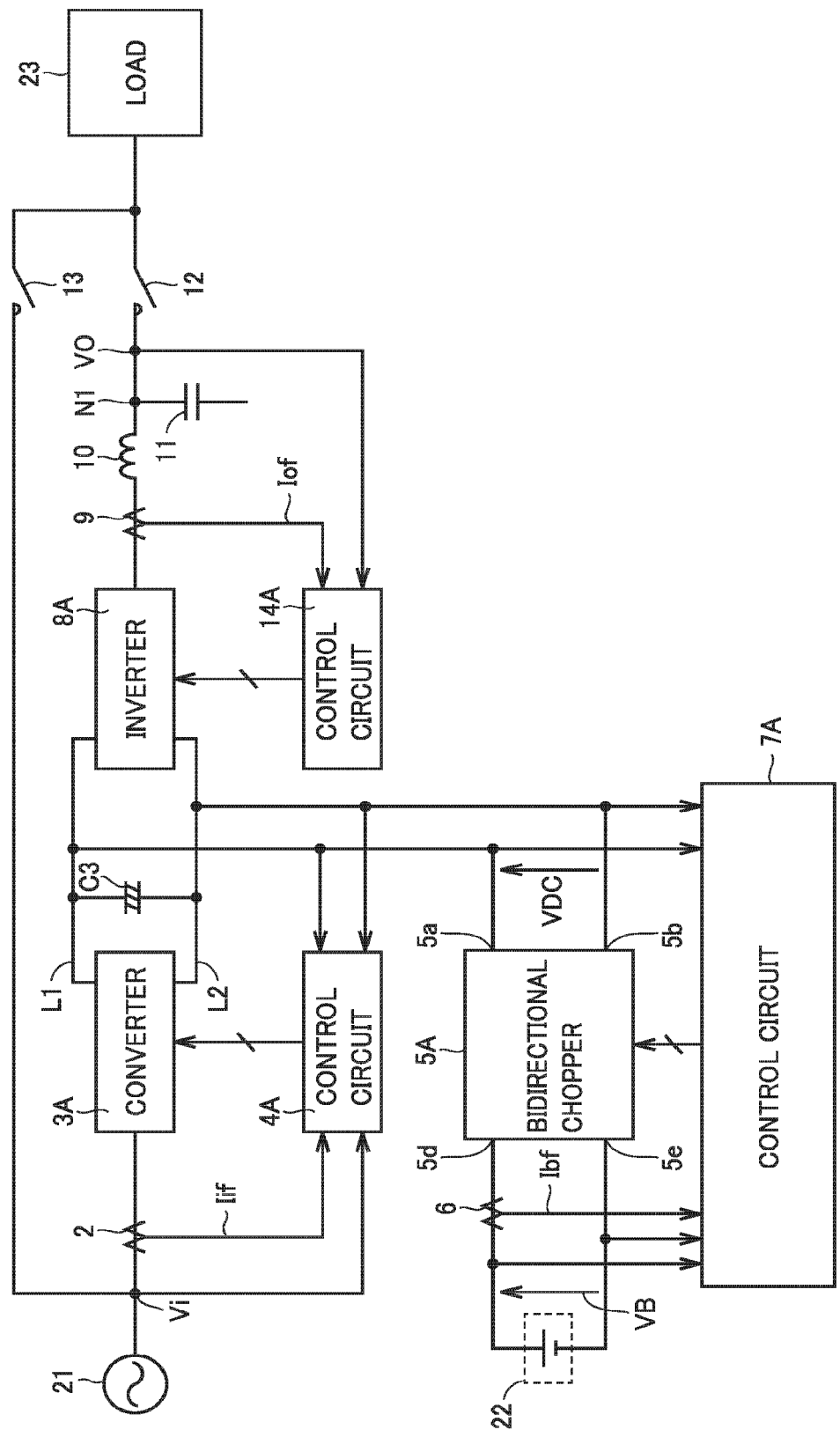
FIG. 13 is a circuit block diagram showing a configuration of an uninterruptible power supply device according to a second embodiment.

FIG. 13 is a circuit block diagram showing a configuration of an uninterruptible power supply device 81 according to a second embodiment, and is a diagram compared with FIG. 1. Referring to FIG. 13, uninterruptible power supply device 81 is different from uninterruptible power supply device 1 shown in FIG. 1 in that converter 3, inverter 8 and bidirectional chopper 5 are replaced with a converter 3A, an inverter 8A and a bidirectional chopper 5A, respectively, control circuits 4, 7 and 14 are replaced with control circuits 4A, 7A and 14A, respectively, capacitors C1 and C2 are replaced with a capacitor C3, and DC line L3 is removed.

Converter 3A is controlled by control circuit 4A. When commercial AC power supply 21 is normal, converter 3A converts AC power into DC power and outputs the DC power to DC lines L1 and L2. When a power failure of commercial AC power supply 21 occurs, an operation of converter 3A is stopped. DC output voltage VDC of converter 3A can be controlled to a desired value.

Capacitor C3 is connected between DC lines L1 and L2, to smooth and stabilize a voltage between DC lines L1 and L2. An instantaneous value of DC voltage VDC between DC lines L1 and L2 is detected by control circuit 4A.

Control circuit 4A detects whether or not a power failure of commercial AC power supply 21 has occurred, based on a detected value of AC input voltage Vi. When commercial AC power supply 21 is normal, control circuit 4A controls converter 3A such that DC voltage VDC becomes equal to predetermined reference DC voltage VDCr (e.g., 660 V), based on AC input voltage Vi, AC input current Ii and DC voltage VDC. When a power failure of commercial AC power supply 21 occurs, control circuit 4A stops the operation of converter 3A.

DC lines L1 and L2 are connected to inverter 8A and are connected to high-voltage-side nodes 5a and 5b of bidirectional chopper 5A, respectively. Low-voltage-side nodes 5d and 5e of bidirectional chopper 5A are connected to the positive electrode and the negative electrode of battery 22, respectively.

Bidirectional chopper 5A is controlled by control circuit 7A. When commercial AC power supply 21 is normal, bidirectional chopper 5A stores the DC power generated by converter 3A in battery 22. When a power failure of commercial AC power supply 21 occurs, bidirectional chopper 5A supplies DC power of battery 22 to inverter 8A through DC lines L1 and L2.

An instantaneous value of DC voltage VDC between DC lines L1 and L2 is detected by control circuit 7A. Current detector 6 detects DC current Ib flowing between low-voltage-side node 5d of bidirectional chopper 5 and the positive electrode of battery 22, and provides signal Ibf indicating the detected value to control circuit 7A. An instantaneous value of inter-terminal voltage VB of battery 22 is detected by control circuit 7A.

Control circuit 7A controls bidirectional chopper 5A based on DC voltage VDC, DC current Ib, and inter-terminal voltage VB of battery 22. Control circuit 7A determines whether or not a power failure of commercial AC power supply 21 has occurred, based on the polarity of DC current Ib.

When commercial AC power supply 21 is normal, control circuit 7A controls bidirectional chopper 5A such that the DC power generated by converter 3A is stored in battery 22 and inter-terminal voltage VB of battery 22 becomes equal to predetermined reference DC voltage VBr (e.g., 480 V).

In addition, in response to the occurrence of a power failure of commercial AC power supply 21, control circuit 7A controls bidirectional chopper 5A such that the DC power of battery 22 is supplied to inverter 8A and DC voltage VDC between DC lines L1 and L2 becomes equal to predetermined reference DC voltage VDCr (e.g., 660 V).

In addition, control circuit 7A stores information indicating a relationship among DC current Ib, time constant τ of a temperature increase of capacitor C11 included in bidirectional chopper 5A, and temperature increase saturation value Ts of capacitor C11. At the time of a power failure of commercial AC power supply 21, based on DC current Ib and the stored information, control circuit 7A calculates estimated temperature increase value Ta of capacitor C11 every time predetermined time period Δt elapses, and stops an operation of bidirectional chopper 5A when calculated estimated temperature increase value Ta exceeds upper limit value Th.

Inverter 8A is controlled by control circuit 14A, and converts the DC power supplied from converter 3A or bidirectional chopper 5A through DC lines L1 and L2 into AC power of a commercial frequency and outputs the AC power. That is, inverter 8A converts the DC power supplied from converter 3A through DC lines L1 and L2 into AC power when commercial AC power supply 21 is normal, and converts the DC power supplied from battery 22 through bidirectional chopper 5A into AC power in response to the occurrence of a power failure of commercial AC power supply 21. An AC output voltage of inverter 8A can be controlled to a desired value.

Figure 14:
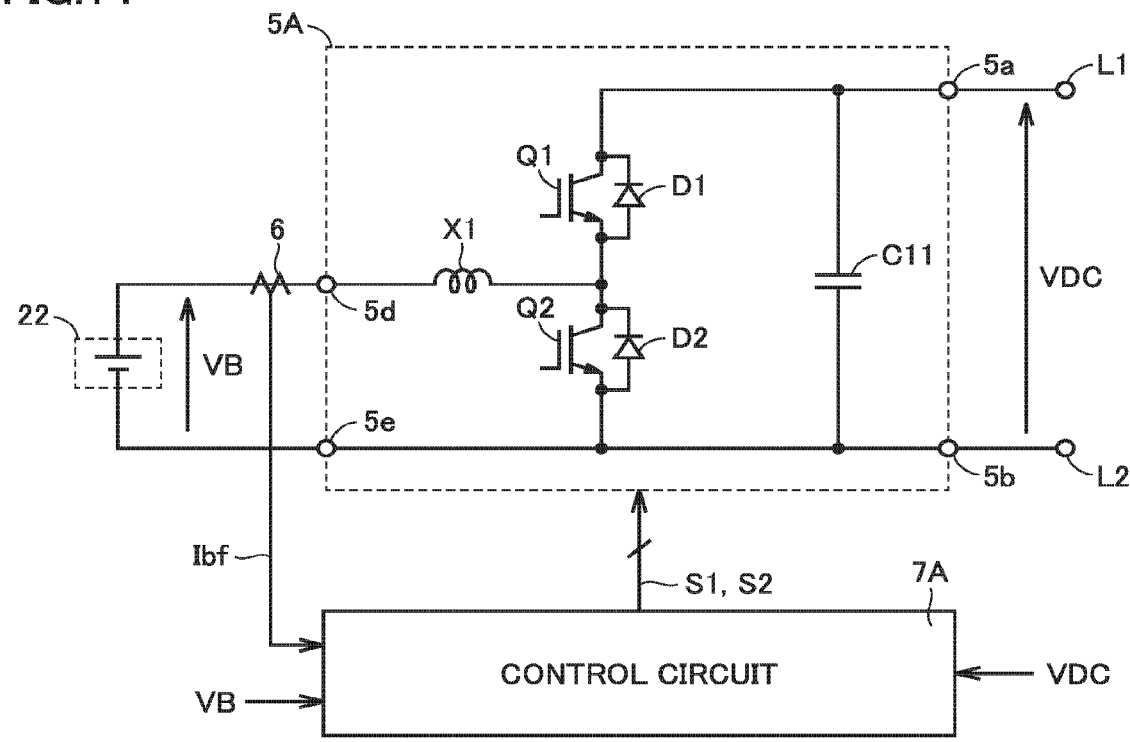
FIG. 14 is a circuit diagram showing a configuration of a bidirectional chopper shown in FIG. 13.

FIG. 14 is a circuit diagram showing a configuration of bidirectional chopper 5A, and is a diagram compared with FIG. 2. In FIG. 14, bidirectional chopper 5A includes IGBTs Q1 and Q2, diodes D1 and D2, reactor X1, and capacitor C11.

A collector of IGBT Q1 is connected to high-voltage-side node 5a, and an emitter thereof is connected to low-voltage-side node 5d with reactor X1 being interposed, and connected to a collector of IGBT Q2. An emitter of IGBT Q2 is connected to high-voltage-side node 5b and low-voltage-side node 5e. Diodes D1 and D2 are connected in antiparallel to IGBTs Q1 and Q2, respectively. Capacitor C11 is connected between high-voltage-side nodes 5a and 5b to stabilize DC voltage VDC between high-voltage-side nodes 5a and 5b.

When commercial AC power supply 21 is normal, IGBT Q1 (first switching element) is turned on and off at a predetermined frequency, and stores the DC power generated by converter 3A in battery 22. When commercial AC power supply 21 is normal, IGBT Q2 is fixed to the off state.

IGBT Q1 is controlled by gate signal S1 from control circuit 7A. Gate signal S1 is set to the "H" level and the "L" level at a predetermined frequency. When gate signal S1 is set to the "H" level, IGBT Q1 is turned on. When gate signal S1 is set to the "L" level, IGBT Q1 is turned off.

In the normal state of commercial AC power supply 21, when IGBT Q1 is turned on in the case of VDC>VB, current Ib flows along a route from DC line L1 through IGBT Q1, reactor X1 and battery 22 to DC line L2, such that battery 22 is charged and electromagnetic energy is stored in reactor X1.

When IGBT Q1 is turned off, a current flows along a route from one terminal (terminal on the battery 22 side) of reactor X1 through battery 22 and diode D2 to the other terminal of reactor X1, such that battery 22 is charged and the electromagnetic energy of reactor X1 is released.

A ratio between a time period during which gate signal S1 is in the "H" level (pulse width) and one period is called "duty ratio". By adjusting a duty ratio of gate signal S1, inter-terminal voltage VB of battery 22 can be adjusted to predetermined reference DC voltage VBr. DC voltage VDC between DC lines L1 and L2 is stepped down and provided to battery 22, and VB<VDC is attained.

In response to the occurrence of a power failure of commercial AC power supply 21, IGBT Q2 (second switching element) is turned on and off at a predetermined frequency, to supply the DC power of battery 22 to inverter 8A.

IGBT Q2 is controlled by gate signal S2 from control circuit 7A. Gate signal S2 is set to the "H" level and the "L" level at a predetermined frequency. When gate signal S2 is set to the "H" level, IGBT Q2 is turned on. When gate signal S2 is set to the "L" level, IGBT Q2 is turned off.

When supply of the AC power from commercial AC power supply 21 is stopped and DC voltage VDC between DC lines L1 and L2 becomes lower than inter-terminal voltage VB of battery 22, IGBT Q1 is fixed to the off state, and on and off of IGBT Q2 is started.

When IGBT Q2 is turned on, a current flows from the positive electrode of battery 22 through reactor X1 and IGBT Q2 to the negative electrode of battery 22, such that electromagnetic energy is stored in reactor X1. When IGBT Q2 is turned off, the current flowing from reactor X1 to IGBT Q2 is commutated from reactor X1 to diode D1 and flows to the negative electrode of battery 22 through capacitor C11, such that battery 22 is charged and the electromagnetic energy of reactor X1 is released.

A ratio between a time period during which gate signal S2 is in the "H" level (pulse width) and one period is called "duty ratio". By adjusting a duty ratio of gate signal S2, DC voltage VDC between DC lines L1 and L2 can be adjusted to predetermined reference DC voltage VDCr. Inter-terminal voltage VB of battery 22 is boosted and provided between DC lines L1 and L2, and VB<VDC is attained.

Control circuit 7A detects whether or not a power failure of commercial AC power supply 21 has occurred, based on output signal Ibf of current detector 6. That is, when a power failure of commercial AC power supply 21 occurs, the operation of converter 3A is stopped, such that the DC power is supplied from capacitor C3 to inverter 8A and DC voltage VDC between DC lines L1 and L2 decreases. When VDC=VB is satisfied, a current does not flow through IGBT Q1 even if IGBT Q1 is turned on and off. Furthermore, when VDC<VB is satisfied, current Ib flows from the positive electrode of battery 22 through reactor X1, diode D1 and capacitor C1 to the negative electrode of battery 22.

Therefore, when a power failure of commercial AC power supply 21 occurs, the polarity of current Ib flowing from low-voltage-side node 5d of bidirectional chopper 5A to the positive electrode of battery 22 is reversed. Assuming that the polarity of current Ib flowing from low-voltage-side node 5d of bidirectional chopper 5A to the positive electrode of battery 22 is negative, control circuit 7A determines the occurrence of a power failure of commercial AC power supply 21 when the polarity of current Ib is reversed from negative to positive. Since the remaining configuration and operation are the same as those of the first embodiment, description thereof will not be repeated.

The second embodiment also produces the same effect as that of the first embodiment.

Although the second embodiment describes the case in which capacitor C3 for stabilizing the output voltage of converter 3A and capacitor C11 for stabilizing the output voltage of bidirectional chopper 5A are provided separately, the present invention is not limited thereto. The same effect is obtained even when capacitor C3 includes capacitor C11. However, capacitor C3 includes a plurality of electrolytic capacitors connected in parallel, and thus, it is necessary to select electrolytic capacitor 60 (FIG. 5) having the maximum temperature increase from those electrolytic capacitors, and detect internal temperature T1 of selected electrolytic capacitor 60 and ambient temperature T2.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1, 81 uninterruptible power supply device; 2, 6, 9 current detector; 3, 3A converter; L1 to L3 DC line; C1 to C3, C11, C12 capacitor; 4, 4A, 7, 7A, 14, 14A control circuit; 5, 5A bidirectional chopper; 8, 8A inverter; 10, X1, X2 reactor; 12, 13 electromagnetic contactor; Q1 to Q4 IGBT; D1 to D4 diode; X1, X2 reactor; 21 commercial AC power supply; 22 battery; 23 load; 31, 36 reference voltage generation unit; 32, 39 correction unit; 33, 37 voltage detector; 34, 38 subtractor; 35, 40 voltage control unit; 41 polarity determiner; 42 discharge determiner; 43 PWM control unit; 51 voltage determination unit; 52 storage unit; 53 computation unit; 54 temperature determination unit; 55 AND gate; 60 electrolytic capacitor; 61, 62 temperature sensor; 71 triangular wave generator; 72, 73 comparator; 74 selector; 75, 76 signal output circuit.

The invention claimed is:

1. A power conversion device comprising:
   a chopper that converts a first DC voltage supplied from a DC power supply into a second DC voltage and supplies the second DC voltage to a DC load;
   a capacitor that stabilizes the second DC voltage;
   a current detector that detects an output current of the DC power supply; and
   a control circuit that, based on a detection result by the current detector, estimates a temperature increase value of the capacitor every time a predetermined time period elapses, and stops an operation of the chopper when the estimated temperature increase value is higher than an upper limit value, wherein
   the control circuit includes:
   a storage that stores information indicating a relationship among the output current of the DC power supply, a time constant of a temperature increase of the capacitor, and a temperature increase saturation value of the capacitor;
   a computation unit that, based on the detection result by the current detector and contents stored in the storage, calculates an estimated temperature increase value of the capacitor every time the predetermined time period elapses; and
   a controller that controls the chopper such that an inter-terminal voltage of the capacitor becomes equal to a reference voltage when the estimated temperature increase value is lower than the upper limit value, and stops the operation of the chopper when the estimated temperature increase value is higher than the upper limit value.

2. The power conversion device according to claim 1, wherein
   the DC power supply is a power storage device that stores DC power, and
   the control circuit also stops the operation of the chopper when an inter-terminal voltage of the power storage device decreases to a discharge end voltage.

3. The power conversion device according to claim 2, wherein
   the chopper and the capacitor constitute a bidirectional chopper,
   the power conversion device further comprises:
   a converter that converts AC power supplied from an AC power supply into DC power; and
   an inverter that converts DC power supplied from the converter or the bidirectional chopper into AC power and supplies the AC power to an AC load,
   the inverter and the AC load constitute the DC load, and
   the bidirectional chopper stores a part of the DC power generated by the converter in the power storage device when the AC power supply is normal, and supplies the DC power of the power storage device to the converter when a power failure of the AC power supply occurs.

4. The power conversion device according to claim 3, wherein
   the capacitor includes first and second sub-capacitors connected in series,
   the bidirectional chopper includes:
   first and second switching elements connected in series between a positive electrode and a negative electrode of the first sub-capacitor;
   third and fourth switching elements connected in series between a positive electrode and a negative electrode of the second sub-capacitor;
   first to fourth diodes connected in antiparallel to the first to fourth switching elements, respectively;
   a first reactor connected between a positive electrode of the power storage device and a first node between the first and second switching elements; and
   a second reactor connected between a second node between the first and second switching elements and a negative electrode of the power storage device,
   the control circuit
   turns on and off the first and fourth switching elements when the AC power supply is normal,
   turns on and off the second and third switching elements when a power failure of the AC power supply occurs, and
   turns off the first to fourth switching elements when an operation of the bidirectional chopper is stopped.

5. The power conversion device according to claim 3, wherein
   the bidirectional chopper includes:
   first and second switching elements connected in series between a positive electrode and a negative electrode of the capacitor;
   first and second diodes connected in antiparallel to the first and second switching elements, respectively; and
   a reactor connected between a positive electrode of the power storage device and a node between the first and second switching elements,
   the control circuit
   turns on and off the first switching element when the AC power supply is normal,
   turns on and off the second switching element when a power failure of the AC power supply occurs, and
   turns off the first and second switching elements when an operation of the bidirectional chopper is stopped.

* * * * *